United States Patent [19]

Baker

[11] Patent Number: 4,784,537

[45] Date of Patent: Nov. 15, 1988

[54] MULTIPLE TOOTH THREAD MILLING APPARATUS

[75] Inventor: Brian Baker, Lake Orion, Mich.

[73] Assignee: GTE Valeron Corporation, Troy, Mich.

[21] Appl. No.: 144,742

[22] Filed: Jan. 19, 1988

Related U.S. Application Data

[63] Continuation of Ser. No. 11,176, Jan. 5, 1987, abandoned.

[51] Int. Cl.⁴ .............................................. B23G 5/00
[52] U.S. Cl. ....................................... 408/222; 407/29
[58] Field of Search ............ 409/65; 10/141 R, 141 H, 10/140, 142; 407/21, 22, 24, 29, 34, 40, 50, 51, 38, 52, 58; 408/222, 713, 215, 216, 199, 197

[56] References Cited

U.S. PATENT DOCUMENTS

| 509,145 | 11/1893 | Thomson | 407/52 |
|---|---|---|---|
| 1,899,023 | 2/1933 | Earl | 407/29 |
| 2,947,062 | 8/1960 | Spear | 407/29 |
| 3,107,413 | 10/1963 | Ohlinger | 407/24 |
| 3,812,547 | 5/1974 | Reich | 10/101 |
| 3,829,921 | 8/1974 | Delaney | 10/141 R |
| 4,133,399 | 1/1979 | Herrmann | 408/713 |
| 4,409,868 | 10/1983 | Huddle et al. | 408/222 |
| 4,461,602 | 7/1984 | Zettl | 407/40 |
| 4,532,863 | 7/1985 | Smith | 10/101 R |
| 4,545,711 | 10/1985 | Dooley | 408/197 |
| 4,572,713 | 2/1986 | Schmidt | 10/101 R |
| 4,674,923 | 6/1987 | Ogilvie et al. | 407/52 X |

FOREIGN PATENT DOCUMENTS

| 119175 | 9/1984 | European Pat. Off. | 408/222 |
|---|---|---|---|
| 2628624 | 12/1977 | Fed. Rep. of Germany | 407/58 |
| 2637757 | 2/1978 | Fed. Rep. of Germany | 408/222 |
| 485421 | 1/1918 | France | 407/21 |
| 1254578 | 11/1971 | United Kingdom | 407/48 |

Primary Examiner—William Briggs
Attorney, Agent, or Firm—David J. Koris

[57] ABSTRACT

Apparatus and cutting insert for milling threads into a workpiece using a single hard cutting insert having a plurality of cutting teeth or a plurality of hard cutting inserts each providing a single cutting surface.

17 Claims, 4 Drawing Sheets

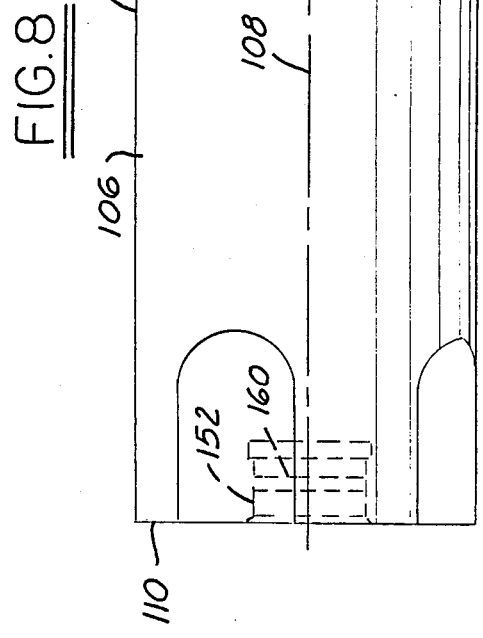
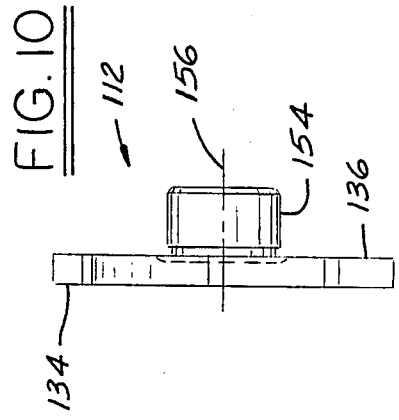
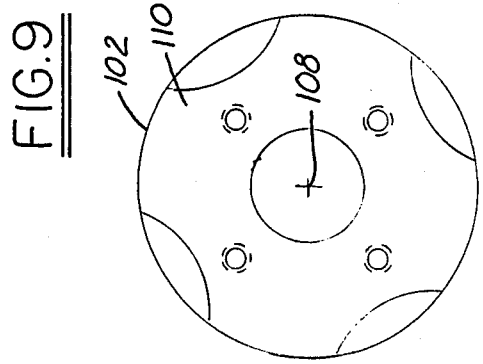
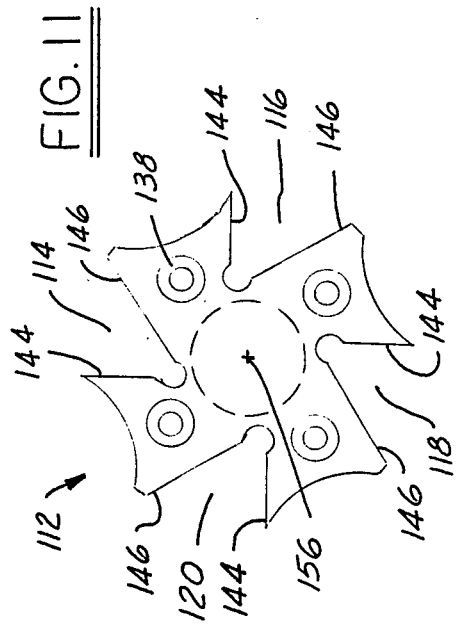

MULTIPLE TOOTH THREAD MILLING APPARATUS

This is a continuation of co-pending application Ser. No. 011,176 filed on Jan. 5, 1987, now abandoned.

BACKGROUND OF THE INVENTION

1. Field of the Invention

The present invention relates to apparatus for milling threads using replaceable multiple tooth hard insert means. In one embodiment a single insert having a plurality of thread cutting teeth is provided. In another embodiment, a plurality of inserts are used, each insert providing one thread cutting tooth.

2. Description of the Prior Art

Thread milling is a known method of producing internal and external threads in a work piece. One type of conventional thread milling machine is the universal machine which typically includes a cutter head mounted upon a cross slide for swivelling through an arc of 180° in order to produce any helix angle of right-hand or left-hand thread. In such apparatus either a single thread milling cutter or a multiple thread milling cutter is provided. Generally, a single thread cutter is used for milling threads having coarse pitches or when the thread length is too great for a multiple thread milling cutter. A single thread cutter includes cutting surfaces which extend radially and are spaced about the periphery of the cutter head to provide a single row of cutting surfaces. During the cutting operation, there is relative movement between the single thread cutter and the work piece for the full length of the thread. A multiple thread milling cutter can be used for milling threads having finer pitches or when the thread length is not too great. A multiple thread cutter includes a series of annular rows of teeth. During the cutting operation, there will usually be 1.10 revolutions of the work spindle relative to the cutter to obtain a full thread form. Single and multiple thread milling cutters are more fully explained in pages 46-40 to 46-45 screw said threads manufacture, A.S.T.M.E. Tool Engineer Handbook, Second Edition, 1959.

In such prior art thread milling equipment the cutting surfaces require profile sharpening or are form relieved. In either case, maintaining of the cutting surface in proper cutting condition is a costly and timely procedure. Therefore, it is highly desirable to provide apparatus for milling threads wherein the cutting surfaces can be readily replaced.

It is further desirable to provide such apparatus wherein it is economical to merely discard the replaced cutting surface.

It is also desirable to provide such apparatus wherein interchangeable cutting surfaces are provided for cutting threads having different physical characteristics.

SUMMARY OF THE INVENTION

This invention achieves these and other results by providing apparatus and a cutting insert for milling threads into a workpiece. The apparatus comprises a cutter spindle having an outer periphery and having a slot extending into such outer periphery. The cutting insert is disposed in the slot for cutting threads into the workpiece. The cutting insert includes a plurality of cutting teeth. Means are attached to the cutter spindle for holding the cutting insert in the slot.

In an alternative embodiment, the thread milling apparatus comprises a cutter spindle having a first end portion and a second end portion and a longitudinal axis extending from the first end portion to the second end portion. The second end portion includes a face area. An end plate is attached to such face area, the end plate lying in a plane which is perpendicular to the longitudinal axis. The end plate includes a plurality of insert pockets extending about the axis spaced around the periphery of the plate. A plurality of cutting inserts is provided, each cutting insert being positioned in an insert pocket. Means is provided coupled to the cutting inserts for holding the cutting inserts in the pockets, and means is provided coupled to the end plate for securing the end plate to the second end portion of the cutter spindle.

BRIEF DESCRIPTION OF THE DRAWINGS

FIG. 8 is a view of the cutter spindle of the embodiment of FIG. 6;

FIG. 9 is an end view of FIG. 8;

FIG. 10 is a view of the end plate of the embodiment of FIG. 6; and,

FIG. 11 is an end view of FIG. 10.

DESCRIPTION OF THE PREFERRED EMBODIMENT

Figure 1:
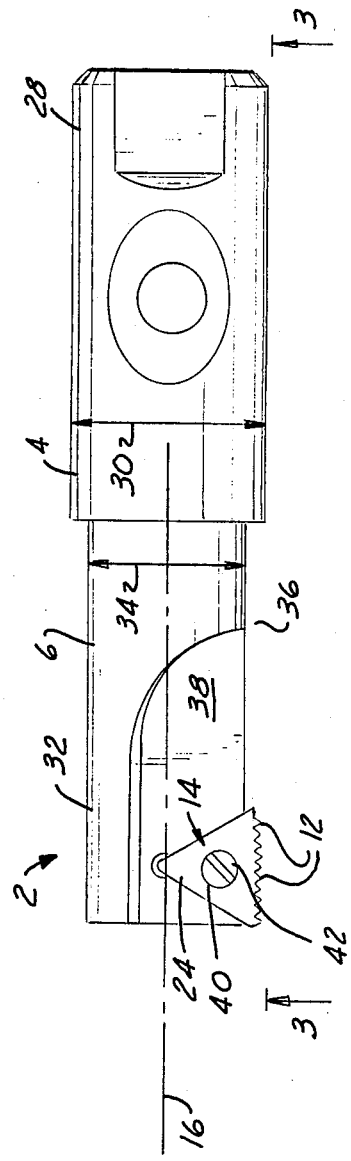
FIG. 1 is a plan view of one embodiment of the present invention.
Figure 2:
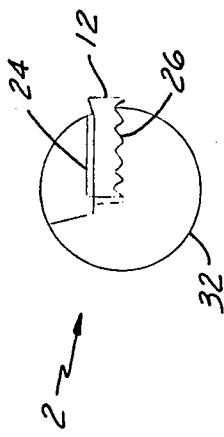
FIG. 2 is an end view of FIG. 1.
Figure 3:
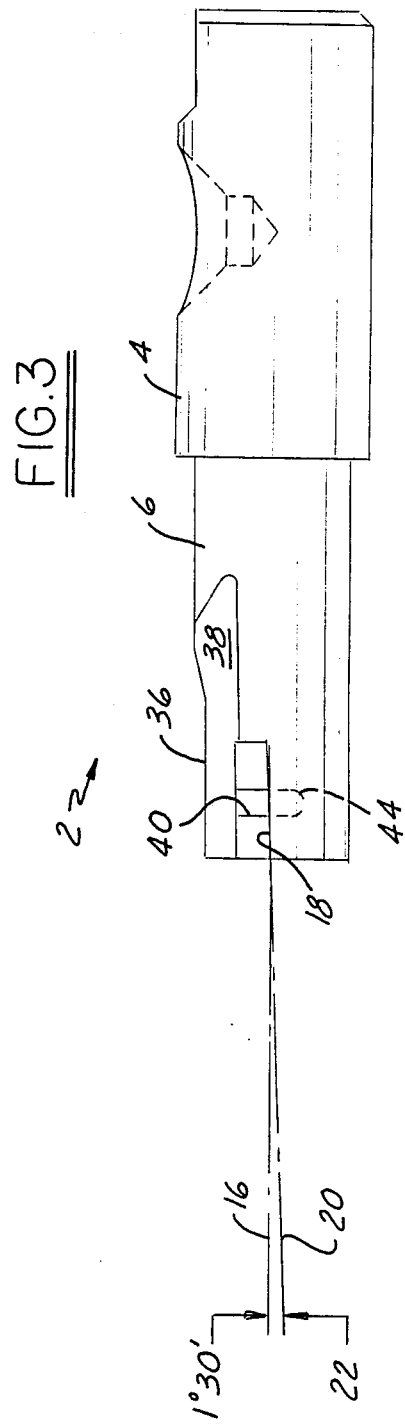
FIG. 3 is a view of FIG. 1 along line 3—3 with the insert removed.

The embodiment of this invention which is illustrated in FIGS. 1 to 4 is particularly suited for achieving the objects of this invention. FIGS. 1 to 3 depict apparatus 2 for milling threads comprising a cutter spindle 4 having an outer periphery 6 and having a slot 8 extending into such outer periphery. A cutting insert 10 is disposed in slot 8. The cutting insert comprises a plurality of cutting teeth 12. Means generally designated 14 is attached to the cutter spindle 4 for holding the cutting insert 10 in slot 8. The cutter spindle 4 includes an axis 16 extending in a longitudinal direction. The slot 8 includes a base surface 18 which lies in a plane which extends in the longitudinal direction, schematically extended at 20. The plane extends from axis 16 at an angle relative to the axis as identified by reference numeral 22. Preferably the angle extends below the axis as depicted in FIG. 3. The angle 22 is equal to the helix angle of the thread being produced. Insert 10 includes a top surface 24 and a bottom surface 26, the bottom surface 26 engaging base surface 18.

In the preferred embodiment the cutter spindle 4 includes a first end portion 28 which is cylindrical and has a first diameter 30. Cylindrical first end portion 28 is for attachment to a thread milling machine. Cutter spindle 4 also includes a second end portion 32 which is generally cylindrical and has a second diameter 34 which is less than the diameter 30 of the first end portion. The generally cylindrical second end portion includes a recessed area 36 including a recessed surface 38 which forms that part of the outer periphery 6 into which slot 8 extends. In the preferred embodiment the slot 8 is configured to conform to the configuration of the cutting insert.

As depicted in FIG. 1, cutting insert 10 includes an aperture 40 extending therethrough from top surface 24 to bottom surface 26. The holding means 14 includes a screw 42 extending through aperture 40 into a corresponding threaded aperture 44 which extends into the base surface 18 of slot 8. In order to further stabilize the insert relative to the cutter spindle, the bottom surface 26 can be serrated as depicted in FIG. 2.

Figure 4B:
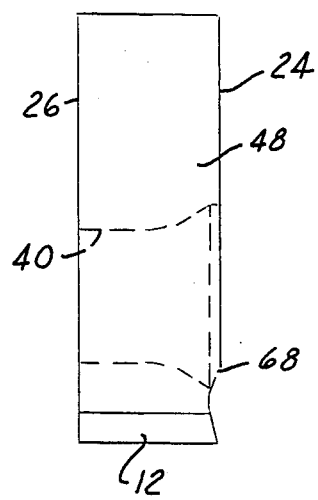
FIGS. 4A is a perspective view of an insert of the present invention and FIG. 4B is an end view thereof.
Figure 4A:
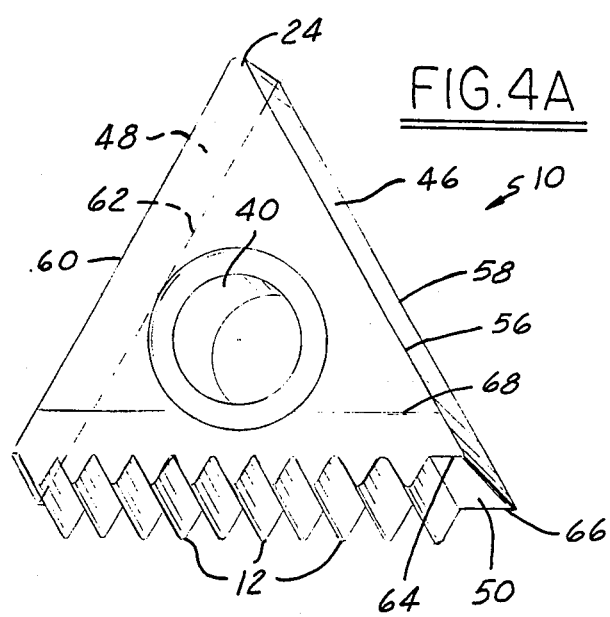

Cutting insert 10 comprises a block of cutting material such as, for example, ceramic material, tungsten carbide or other hard metal. Such materials are known in the thread milling art. The insert is depicted in FIG. 4 as including a plurality of sides 46, 48, 50 extending from top surface 24 and bottom surface 26. At least one of such sides such as side 50 comprises a plurality of the cutting teeth 12, each tooth preferably extending from top surface 24 to bottom surface 26. The insert 10 includes aperture 40 extending therethrough and such aperture can be countersunk to facilitate attachment of the insert to the cutter spindle by screw 42 in a known manner.

In the preferred embodiment top surface 24 is parallel to botteme surface 26 and each side 46, 48, 50 extends between corresponding edges 56 and 58, 60 and 62, and 64 and 66, respectively, of the top and bottom surfaces. For example, side 46 extends between corresponding edges 56 and 58, side 48 extends between corresponding edges 60 and 62, and side 50 extends between corresponding edges 64 and 66. Preferably at least the side having the plurality of cutting teeth intersects the top and bottom surfaces at an angle equal to 90°. For example, in the embodiment of FIG. 4, side 50 intersects top surface 24 at edge 64 at an angle equal to 90° and intersects bottom surface 26 at edge 66 at an angle equal to 90°. Although not necessary, one or more of the remaining sides can also intersect the top and bottom surfaces at an angle equal to 90°.

Preferably the insert 10 include a lip 68 which extends along the top surface parallel to and spaced from the side having the plurality of teeth 12. For example, as depicted in FIG. 4, lip 68 extends along top surface 24, parallel to edge 64 and side 50. By providing such a lip along the profiled cutting edge 64, rake correction as well as an effective top rake can be provided for.

Figure 5A:
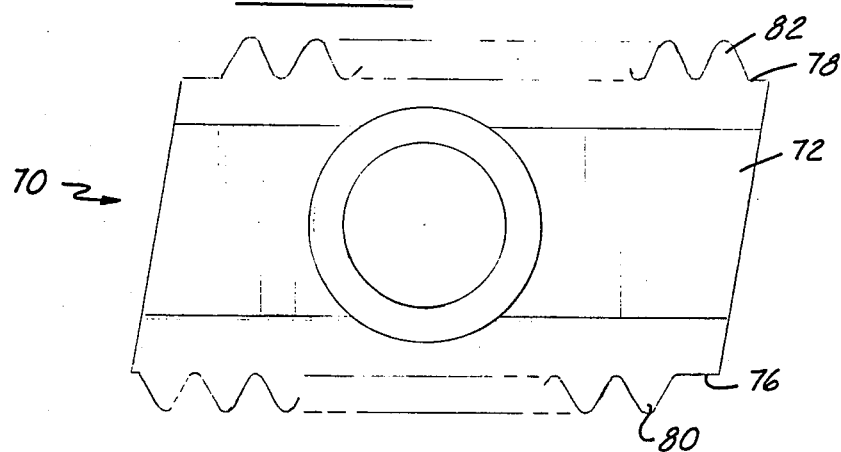
FIGS. 5A and 5B are plan and end views of an alternative embodiment of an insert of the present invention.
Figure 5B:
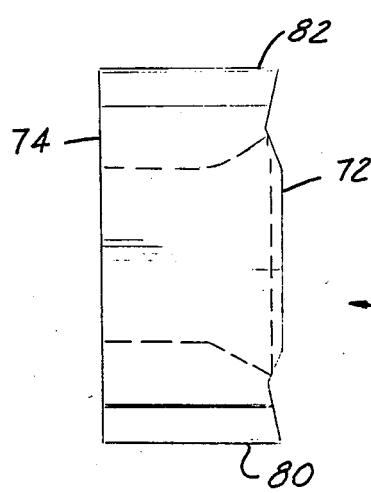
Figure 6:
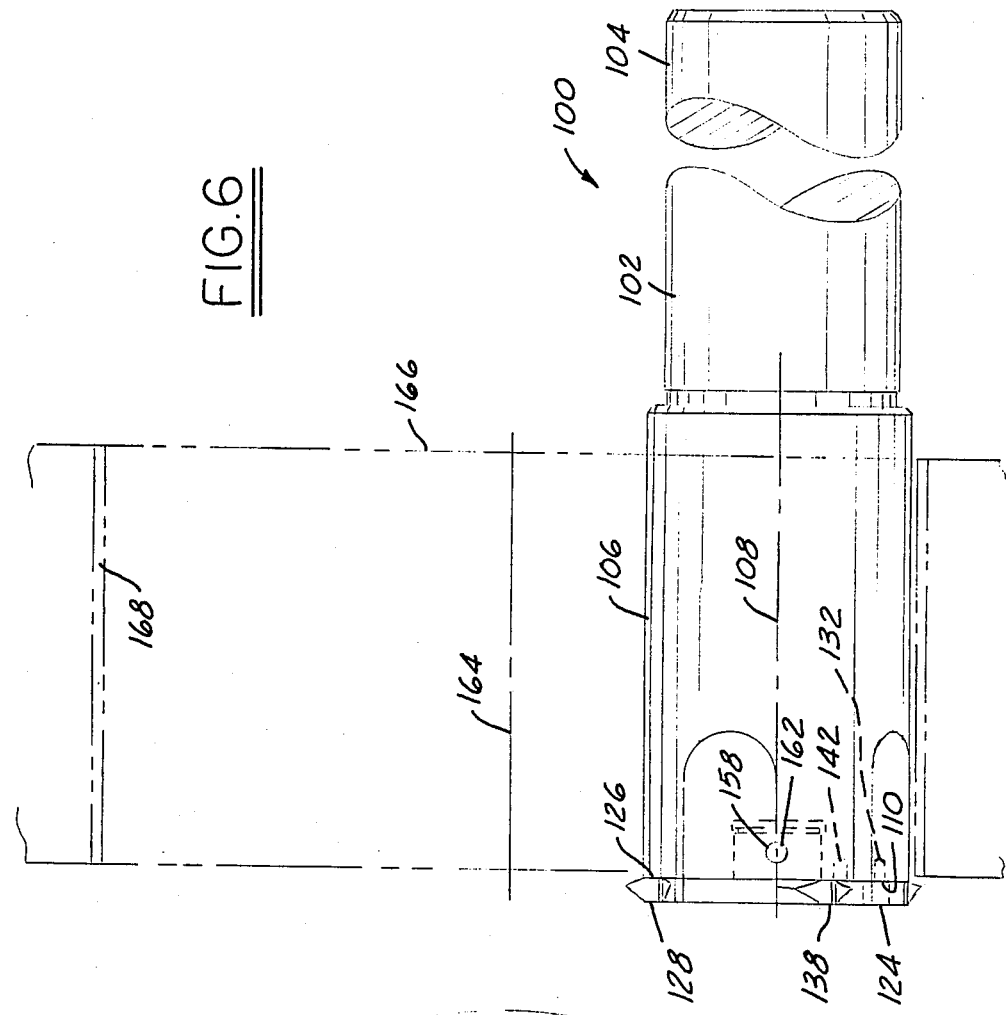
FIG. 6 is a schematic representation of an alternative embodiment of the present invention.
Figure 7:
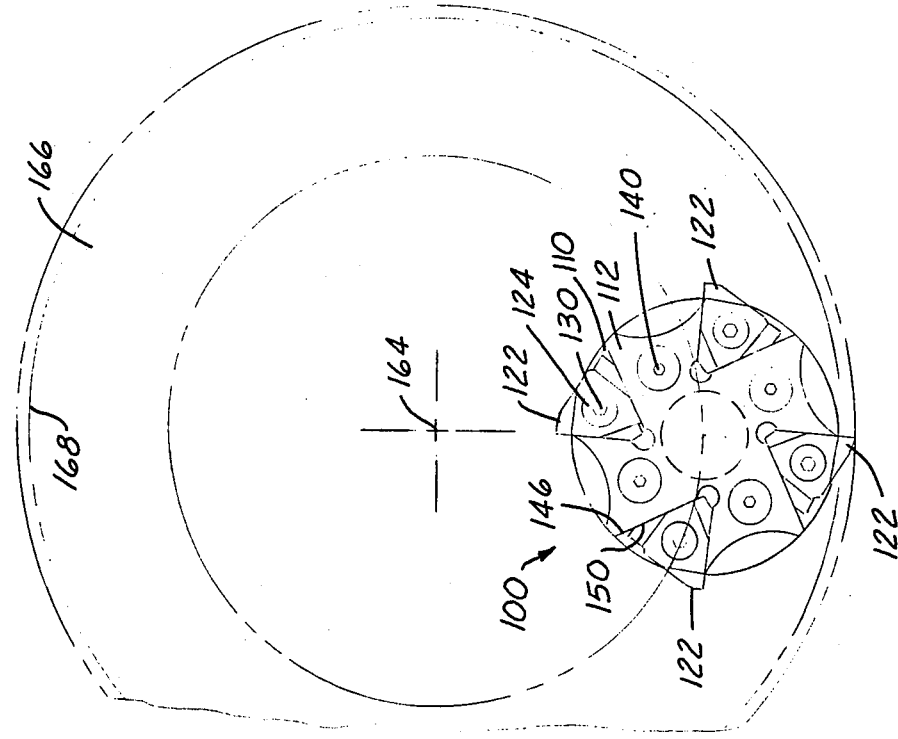
FIG. 7 is an end view of the representation of FIG. 6.

Cutting insert 10 can be configured such that the top surface and bottom surface are triangular as shown in FIG. 4. However, other configurations are possible. For example, FIG. 5 depicts an insert 70 having a top surface and bottom surface which are in the shape of a parallelogram. In the embodiment of FIG. 5, top surface 72 and bottom surface 74 are rectangular. Other configurations such as, for example, squares and rhomboids are also within the teachings of this invention. One of the advantages of the embodiment of FIG. 5 is that at least each side of at least one pair of opposing sides such as sides 76 and 78 can include a plurality of cutting teeth 80, 82.

In operation, the cutter spindle 4 is attached to a thread milling machine and caused to rotate in a known manner about its axis 16. Simultaneously, the cutter spindle 4 is rotated in accordance with known circular interpolating principles about the axis of the stationary work-piece being threaded. By providing a multi-thread form along one edge of the insert, a complete thread is produced in such workpiece in one full traverse of the cutter about its axis and about the axis of the workpiece. The cutter can then be moved axially forward to the next pitch of threads and the process repeated. Both internal and external threads can be cut in this manner.

In the embodiment of FIGS. 6 to 11 an alternative apparatus 100 for milling threads is provided comprising a cutter spindle 102 having a first end portion 14 and a second end portion 106. Spindle 102 includes a longitudinal axis 108 extending from the first end portion 104 to the second end portion 106. Second end portion 106 includes a face area 110 to which is attached an end plate 112. Face area 110 lies in a plane which is perpendicular to the longitudinal axis 108. End plate 112 also lies in a plane which is perpendicular to the longitudinal axis 108. The end plate includes a plurality of insert pockets, four such pockets 114, 116, 118 and 120 being depicted in FIG. 11 although more or less are possible. The insert pockets extend about axis 108 around the periphery of the end plate. A plurality of hard cutting inserts 122 is provided such that there is an insert 122 positioned in each insert pocket. Means coupled to the inserts is provided for holding the inserts in the pockets. For example, in the preferred embodiment each cutting insert includes an aperture 124 extending therethrough from a first insert surface 126 to a second insert surface 128, and a screw 130 extends through aperture 124 into a corresponding threaded aperture 132 which extends into the face area 110. Means coupled to the end plate 112 is provided for securing the end plate to the second end portion 106 of the cutter spindle. For example, in the preferred embodiment the end plate 112 includes an upper surface 134, a lower surface 136, and a plurality of bores 138 extending therethrough from the upper to the lower surface. A plurality of screws 140 is provided, each screw extending through a respective bore 138 into a corresponding threaded bore 142 which extends into face are 110.

The cutting inserts 122 each include a plurality of sides extending from the first surface 126 to the second surface 128, the first surface being parallel to the second surface, and the first surface engaging face area 110. At least one of the sides comprises a cutting portion although as known in the art the insert can have various cutting portions or edges on more than one side. For example, known indexable and reversible hard cutting inserts of tungsten carbide can be used in this embodiment of the present invention.

In the preferred embodiment, the upper surface 134 of the end plate 112 is parallel to the lower surface 136. Each insert pocket 114, 116, 118, 120 is defined by a plurality of insert support side surfaces, two such insert support side surfaces 144 and 146 being depicted for each insert pocket shown in FIG. 11, although more insert support side surfaces are possible. Surface 144 and 146 extend from upper surface 134 to lower surface 136 and preferably intersect the upper and lower surfaces at an angle equal to 90°. The lower surface 136 engages the face area 110. For proper insert alignment, preferably at least two sides of each cutting insert engage respective corresponding insert support side surfaces. For example, in the embodiment depicted in FIG. 7 sides 148 and 150 of each insert 122 engage respective corresponding insert supprot side surfaces 144 and 146 of respective insert pockets 114, 116, 118 and 120. In order to assure proper insert alignment in the radial and axial directions so that during the milling operation the plurality of inserts 122 track the thread being cut within the tolerance error of such thread, the insert support side surfaces 144 and 146 and the face area 110 have a tolerance error equal to about one half of the tolerance error of the threads being produced.

It has been noted that the end plate 112 is secured to the cutter spindle by means of screws 140. Such securing means prevents movement of the end plate vis-a-vis the cutter spindle. To further secure the end plate to the cutter spindle the second end portion 106 includes an aperture 152 extending into the cutter spindle from the face area 110 along axis 108. End plate 112 includes a corresponding protuberance 154 extending from lower surface 136 along a central axis 156. The protuberance 154 extends into the aperture 152 and is secured in place by securing means. For example, protuberance 154 includes a bore 158 extending therethrough in a plane perpendicular to axis 156. In a like manner, second end portion 106 has a bore 160 extending therethrough. A pin 162 is press fit into bores 158 and 160 to hold the end plate in place.

In operation, the cutter spindle 102 is attached to a thread milling machine and caused to rotate in a known manner about its axis 108. Simultaneously, the cutter spindle 102 is rotated in accordance with known circular interpolating principles about the axis 164 of the workpiece 166 being threaded internally at 168 in the embodiment of FIGS. 6 and 7. By providing a single thread form, the total length of the thread being cut is obtained by feeding the workpiece parallel to the axis 108 of the cutter spindle 102 at a feed rate equal to the pitch to be cut. Both internal and external threads can be cut in this manner.

In all embodiments of the present invention the cutting surfaces can be replaced merely by replacing one cutting insert with another and discarding the replaced insert. Inserts having different thread forms can be provided which in effect provides interchangeability of cutting surfaces for cutting threads having different physical characteristics.

The embodiments which have been described herein are but some of several which utilize this invention and are set forth here by way of illustration but not of limitation. It is apparent that many other embodiments which will be readily apparent to those skilled in the art may be made without departing materially from the spirit and scope of this invention.

I claim:

1. Apparatus for milling threads comprising:

A cutter spindle having a first end portion and a second end portion, said cutter spindle having a longitudinal axis extending from said first end portion to said second end portion.

said second end portion having a face area and an aperture extending into said cutter spindle from said face area along said longitudinal axis, an end plate attached to said face area and having a corresponding protuberance extending from said end plate along a central axis into said aperture, said protuberance and said second end portion having first and second bores extending therethrough in a plane perpendicular to said axis, and further having a pin which is press fit into said first bore and said second bore, said end plate having a plurality of insert pockets extending about said axis spaced around the periphery of said end plate, a plurality of cutting inserts positioned in said pockets, and means coupled to said cutting inserts for holding said cutting inserts in said pockets.

2. Apparatus of claim 1 wherein said face area lies in a plane which is perpendicular to said longitudinal axis, and wherein said cutting inserts each include a first surface and a second surface and a plurality of sides extending from said first surface to said second surface, at least one of said sides comprising a cutting portion of said cutting insert, said first surface being parallel to said second surface and said first surface engaging said face area.

3. Apparatus of claim 2 wherein each cutting insert includes an aperture extending therethrough from said first surface to said second surface, and wherein said holding means includes a screw extending through said aperture into a corresponding threaded aperture which extends into said face area.

4. Apparatus of claim 3 wherein said end plate includes an upper surface and a lower surface, said upper surface being parallel to said lower surface, each insert pocket being defined by a plurality of insert support side surfaces which extend from said upper surface to said lower surface, said lower surface engaging said face area, and at least two of said sides of said cuttign inserts engaging respective corresponding of at least two of said insert support side surfaces.

5. Apparatus of claim 4 wherein said end plate includes a plurality of bores extending therethrough from said upper surface to said lower surface, and wherein said securing means includes a plurality of screws each of which extend through a respective bore of said plurality of bores into a corresponding threaded bore which extends into said face area.

6. An end plate for use in apparatus for milling threads, and having a longitudinal axis, comprising an upper surface and a lower surface, said upper surface being parallel to said lower surface and lying in a plane which is perpendicular to said longitudinal axis, said end plate including a protuberance extending from said lower surface along said longitudinal axis, said end plate further including a bore extending through said protuberance in a plane perpendicular to said longitudinal axis, a plurality of insert pockets spaced about said axis around the periphery of said end plate, each insert pocket being defined by a plurality of insert support side surfaces which extend from said upper surface to said lower surface, said pockets adapted to receive cutting inserts for milling threads.

7. An end plate for use in apparatus for milling threads, and having a longitudinal axis, comprising an upper surface and a lower surface, said upper surface being parallel to said lower surface and lying in a plane which is perpendicular to said longitudinal axis, said end plate including a protuberance extending from said lower surface along said longitudinal axis, a plurality of insert pockets spaced about said axis around the periphery of said end plate, each insert pocket being defined by a plurality of insert support side surfaces which extend from said upper surface to said lower surfaces, said side surfaces having a tolerance error equal to about one-half of the tolerance error of said thread being produced, said pockets adapted to receive cutting inserts for milling threads.

8. The end plate of claim 7 wherein said insert support side surfaces intersect said upper surface at an angle equal to 90 degrees and said lower surface at an angle equal to 90 degrees.

9. Apparatus for milling threads comprising a cutter spindle having a first end portion and a second end portion, said cutter spindle having a longitudinal axis extending from said first end portion to said second end portion, said second end portion having a face area and an aperture extending into said cutter spindle from said face area along said longitudinal axis, an end plate attached to said face area having a corresponding protuberance extending from said end plate along a central axis of said end plate, said end plate lying in a plane which is perpendicular to said longitudinal axis, said protuberance extending into said aperture, said end plate having a plurality of insert pockets extending about said axis spaced around the periphery of said end plate, a plurality of cutting inserts, each cutting insert of said plurality of cutting inserts being positioned in an insert pocket of said plurality of insert pockets, means coupled to said cutting inserts for holding said cutting inserts in said pockets, and means for securing said protuberance to said second end portion of said cutter spindle.

10. Apparatus of claim 9 wherein said face area lies in a plane which is perpendicular to said longitudinal axis, and wherein said cutting inserts each include a first surface and a second surface and a plurality of sides extending from said first surface to said second surface, at least one of said sides comprising a cutting portion of said cutting insert, said first surface being parallel to said second surface and said first surface engaging said face area.

11. Apparatus of claim 10 wherein each cutting insert includes an aperture extending therethrough from said first surface to said second surface, and wherein said holding means includes a screw extending through said aperture into a corresponding threaded aperture which extends into said face area.

12. Apparatus of claim 11 wherein said end plate includes an upper surface and a lower surface, said upper surface being parallel to said lower surface, each insert pocket being defined by a plurality of insert support side surfaces which extend from said upper surface to said lower surface, said lower surface engaging said face area, and at least two of said sides of said cutting inserts engaging respective corresponding of at least two of said insert support side surfaces.

13. Apparatus of claim 12 wherein said end plate includes a plurality of bores extending therethrough from said upper surface to said lower surface, and wherein said securing means includes a plurality of screws each of which extend through a respective bore of said plurality of bores into a corresponding threaded bore which extends into said face area.

14. Apparatus of claim 12 wherein said insert support side surfaces and said face area have a tolerance error equal to about one half of the tolerance error of said threads being produced.

15. An end plate for use in apparatus for milling threads, and having a longitudinal axis, comprising an upper surface and a lower surface, said upper surface being parallel to said lower surface and lying in a plane which is perpendicular to said longitudinal axis, said end plate including a protuberance extending from said lower surface along said longitudinal axis, a plurality of insert pockets spaced about said axis around the periphery of said end plate, each insert pocket being defined by a plurality of insert support side surfaces which extend from said upper surface to said lower surfaces, said pockets adapted to receive cutting inserts for milling threads.

16. The end plate of claim 15 further including a plurality of apertures spaced about said longitudinal axis, said apertures extending through said end plate from said upper surface to said lower surface.

17. The end plate of claim 15 wherein said insert support side surfaces intersect said upper surface at an angle equal to 90° and said lower surface at an angle equal to 90°.

* * * * *